(12) United States Patent
Kaneko et al.

(10) Patent No.: US 12,528,412 B2
(45) Date of Patent: Jan. 20, 2026

(54) BRACKET AND INFORMATION ACQUISITION MODULE

(71) Applicant: AGC Inc., Tokyo (JP)

(72) Inventors: Satoshi Kaneko, Tokyo (JP); Ryosuke Shoji, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/428,052

(22) Filed: Jan. 31, 2024

(65) Prior Publication Data

US 2024/0227677 A1 Jul. 11, 2024

Related U.S. Application Data

(63) Continuation of application No. PCT/JP2022/027229, filed on Jul. 11, 2022.

(30) Foreign Application Priority Data

Aug. 2, 2021 (JP) ................. 2021-126544

(51) Int. Cl.
*F16M 11/00* (2006.01)
*B60R 1/23* (2022.01)
*B60R 11/00* (2006.01)

(52) U.S. Cl.
CPC .......... *B60R 1/23* (2022.01); *B60R 2011/0026* (2013.01); *B60R 2011/0063* (2013.01)

(58) Field of Classification Search
CPC .............. B60R 1/23; B60R 2011/0026; B60R 2011/0063; B60R 11/04
See application file for complete search history.

(56) References Cited

U.S. PATENT DOCUMENTS

| | | | |
|---|---|---|---|
| 5,879,156 A * | 3/1999 | DeLeo | A61C 7/16 433/8 |
| 11,781,337 B2 * | 10/2023 | Beisser, III | E04H 17/10 256/65.03 |
| 2015/0314735 A1 | 11/2015 | Krug et al. | |
| 2017/0035004 A1 * | 2/2017 | McMurray | A01G 9/024 |
| 2017/0341491 A1 | 11/2017 | Nakagawa | |

(Continued)

FOREIGN PATENT DOCUMENTS

| | | |
|---|---|---|
| JP | 2015-533355 A | 11/2015 |
| JP | 2016-088493 A | 5/2016 |

(Continued)

OTHER PUBLICATIONS

International Searching Authority, "International Search Report," issued in connection with International Patent Application No. PCT/JP2022/027229, dated Sep. 13, 2022.

(Continued)

*Primary Examiner* — Amy J. Sterling
(74) *Attorney, Agent, or Firm* — Foley & Lardner LLP (57) ABSTRACT

A bracket capable of appropriately attaching an information acquisition device to a window glass for a vehicle is provided. A bracket according to an embodiment of the present disclosure is made of resin for fixing an information acquisition device to a window glass for a vehicle having a curved shape. The bracket includes a plurality of regions and a coupling region provided between the plurality of regions. The coupling region has a mesh-like structure and flexibly couples each of the plurality of regions.

8 Claims, 12 Drawing Sheets

(56) References Cited

U.S. PATENT DOCUMENTS

| | | |
|---|---|---|
| 2018/0141500 A1 | 5/2018 | Silvestrini et al. |
| 2018/0200983 A1 | 7/2018 | Nakagawa |
| 2021/0178985 A1 | 6/2021 | Takeda et al. |
| 2021/0380047 A1 | 12/2021 | Otake et al. |

FOREIGN PATENT DOCUMENTS

| | | |
|---|---|---|
| JP | 6067131 B2 | 1/2017 |
| JP | 6785541 B2 | 11/2020 |
| JP | 6788613 B2 | 11/2020 |
| JP | 2021-091339 A | 6/2021 |
| JP | 2021-187382 A | 12/2021 |

OTHER PUBLICATIONS

International Searching Authority, "Written Opinion," issued in connection with International Patent Application No. PCT/JP2022/027229, dated Sep. 13, 2022.

* cited by examiner

BRACKET AND INFORMATION ACQUISITION MODULE

INCORPORATION BY REFERENCE

This application is based upon and claims the benefit of priority from Japanese Patent Application 2021-126544 filed on Aug. 2, 2021, and PCT application No. PCT/JP2022/027229 filed on Jul. 11, 2022, the disclosure of which is incorporated herein in its entirety by reference.

BACKGROUND

The present disclosure relates to a bracket and an information acquisition module.

In recent years, the development of a driver support system including an information acquisition device such as a camera attached to a windshield of a vehicle for supporting a driver has been progressing. The information acquisition device used in the driver support system is attached to the windshield with a resin bracket interposed therebetween. For example, the resin bracket is pasted to the windshield using an adhesive, and the information acquisition device is fixed to the pasted bracket. Then, the information acquisition device such as a camera is attached to the windshield by attaching a cover covering the information acquisition device to the bracket.

Japanese Patent No. 6067131 and Japanese Patent No. 6788613 disclose a technology related to a bracket for attaching an information acquisition device such as a camera to a windshield of a vehicle.

SUMMARY

In recent years, the number of information acquisition devices attached to a window glass for a vehicle (windshield) has increased with the enhancement of the functions of the driver assistance system. As the number of information acquisition devices attached to a window glass for a vehicle increases, an area of the bracket used to attach the information acquisition device also increases.

Figure 3:
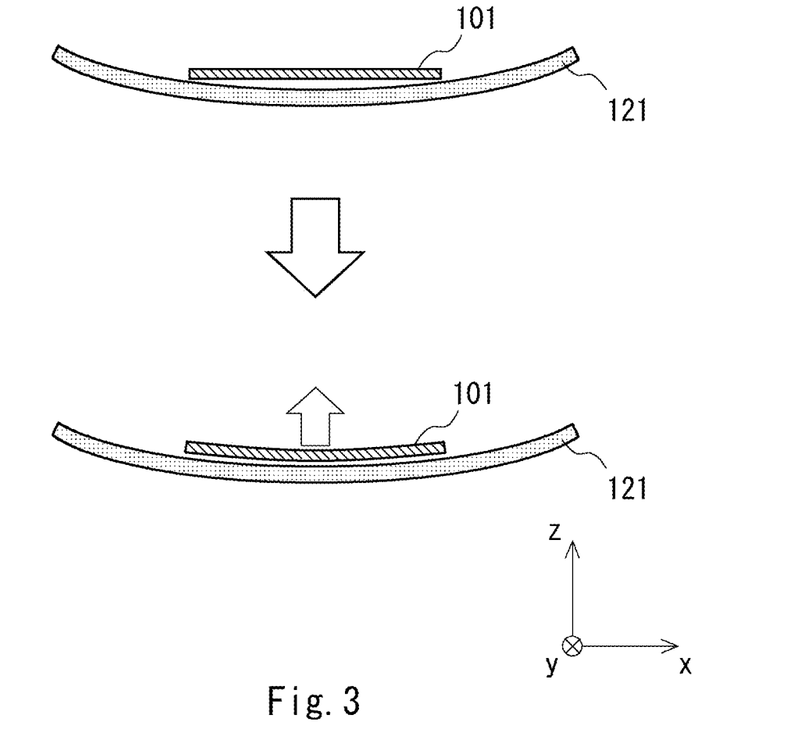
FIG. 3 is a cross-sectional view for explaining a state in which a bracket according to related art is pasted to a window glass for a vehicle.

However, since the window glass for a vehicle has a curved shape, when the area of the bracket increases, the restoring force (the force that tries to return to its original shape: see the lower drawing of FIG. 3) acting on the bracket when it is pasted to the window glass for a vehicle becomes larger. Therefore, there is a problem after the bracket is pasted to the window glass for a vehicle that the bracket may come off, a position of a fixing member for attaching the information acquisition device may be shifted, and a fitting failure may occur.

In view of the above problems, it is an object of the present disclosure to provide a bracket and an information acquisition module capable of appropriately attaching an information acquisition device to a window glass for a vehicle.

An embodiment of the present disclosure is a bracket made of resin for fixing an information acquisition device to a window glass for a vehicle having a curved shape, the bracket comprising: a plurality of regions; and a coupling region provided between the plurality of regions. The coupling region has a mesh-like structure and flexibly couples each of the plurality of regions.

Another embodiment of the present disclosure is an information acquisition module comprising: the above bracket pasted to the window glass for a vehicle; a plurality of information acquisition devices attached to the plurality of regions of the bracket, respectively; and a cover for covering the plurality of information acquisition devices.

According to the present disclosure, it is possible to provide a bracket and an information acquisition module capable of appropriately attaching an information acquisition device to a window glass for a vehicle.

DESCRIPTION OF EMBODIMENTS

Figure 1:
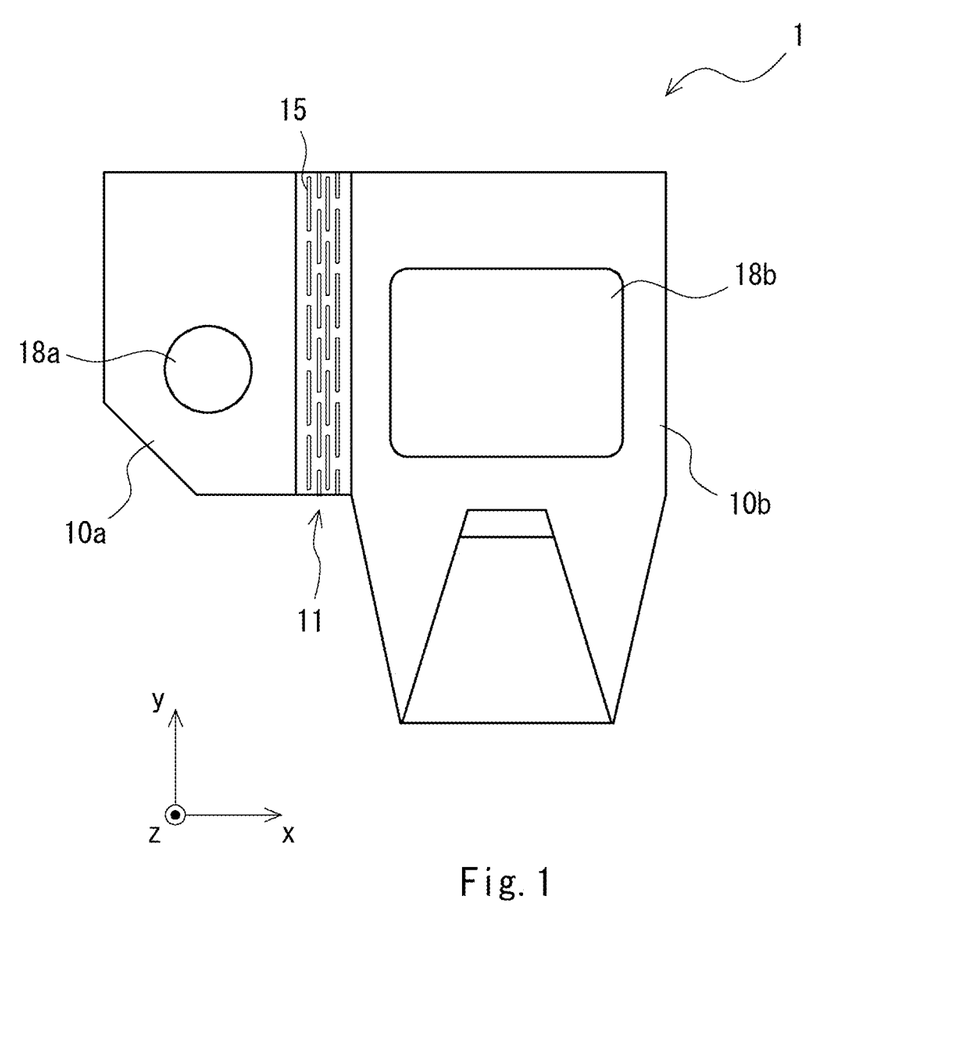
FIG. 1 is a plan view for explaining a bracket according to an embodiment.

Embodiments of the present disclosure will now be described with reference to the drawings. FIG. 1 is a plan view for explaining a bracket according to the embodiment. As shown in FIG. 1, the bracket 1 according to the embodiment includes a plurality of regions 10a and 10b and a coupling region 11. The coupling region 11 has a mesh-like structure with at least some parts of the member removed, and flexibly couples each of the plurality of regions 10a and 10b. The plurality of regions 10a and 10b are provided with holes 18a and 18b, respectively.

In the configuration example shown in FIG. 1, the plurality of regions 10a and 10b are arranged in the x-axis direction (left-right direction). The regions 10a and 10b are coupled to each other with the coupling region 11 interposed therebetween. A plurality of elongated holes 15 are formed in the coupling region 11. That is, by removing at least some parts of the material constituting the coupling region 11 to form the elongated holes 15, the coupling region 11 can be meshed. By meshing the coupling region 11 in this way, the plurality of regions 10a and 10b can be flexibly coupled. Specifically, the coupling region 11 couples the plurality of regions 10a and 10b in such a way that the plurality of regions 10a and 10b are displaced in the x-axis direction (left-right direction), the z-axis direction (direction different from the x-axis direction and the y-axis direction), and the y-axis direction (up-down direction). In each drawing, the x-axis direction, the y-axis direction, and the z-axis direction are perpendicular to each other, but they may be oblique rather than perpendicular to each other.

In particular, in the configuration example shown in FIG. 1, the longitudinal direction of the plurality of elongated holes 15 formed in the coupling region 11 extend in the y-axis direction. Therefore, the coupling region 11 has a structure that is easy to expand and contract in the x-axis direction. Thus, the coupling region 11 can couple the region 10a to the region 10b in such a way that they are easily expanded and contracted in the x-axis direction.

The bracket 1 according to this embodiment is made of a resin material. Polybutylene terephthalate, a mixture of polycarbonate and acrylonitrile butadiene styrene, or the like is used as the resin material. Glass fibers may be mixed with these resins.

For example, the bracket 1 may be integrally formed using injection molding. In other words, the bracket 1 may be integrally formed by injecting a molten resin material into a mold corresponding to the shapes of the plurality of regions 10a and 10b, and the coupling region 11 and then cooling it.

Figure 2:
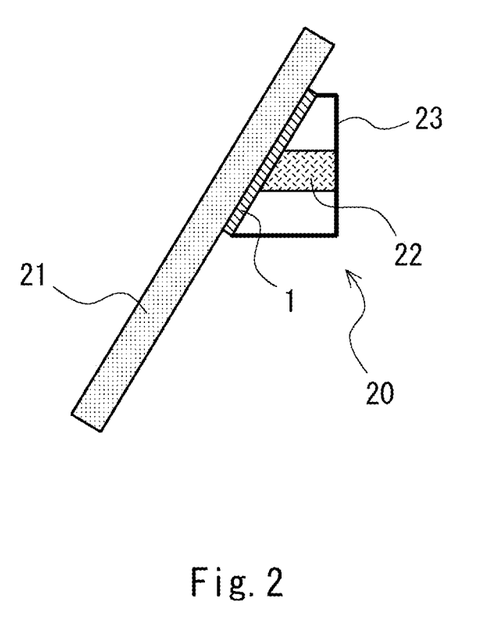
FIG. 2 is a cross-sectional view for explaining an information acquisition module according to the embodiment.

The bracket 1 according to this embodiment is used for fixing an information acquisition device to the window glass for a vehicle having a curved shape. The window glass for a vehicle may be a windshield attached to the front part of the vehicle, a rear glass attached to the rear part of the vehicle, or a fixed side glass attached to the side part of the vehicle. FIG. 2 is a cross-sectional view for explaining an information acquisition module 20 according to this embodiment. As shown in FIG. 2, the bracket 1 is pasted to the inside of the window glass 21 for a vehicle. For example, the bracket 1 is pasted to the window glass 21 for a vehicle using an adhesive. An information acquisition device 22 is attached to the bracket 1. For example, the information acquisition device 22 can be fixed to the bracket 1 by fitting the information acquisition device 22 to a fixing member provided in the bracket 1 and screwing it. A cover 23 for covering the information acquisition device 22 is fixed to the bracket 1. For example, the cover 23 can be fixed to the bracket 1 by fitting the cover 23 to a fixing member provided in the bracket 1 and screwing it.

In this embodiment, it is preferable to attach different information acquisition devices 22 to the plurality of regions 10a and 10b shown in FIG. 1. However, the same information acquisition device 22 may be attached to each of the plurality of regions 10a and 10b. Each of the plurality of regions 10a and 10b is provided with a fixing member for fixing each information acquisition device 22. As described above, by attaching different information acquisition devices 22 to the plurality of regions 10a and 10b, and by the coupling region 11 flexibly bending or expanding and contracting, it is possible to help prevent a decrease in the mounting accuracy of the information acquisition devices 22 even when the relative positions of the plurality of regions 10a and 10b are shifted.

The information acquisition device 22 may be, for example, at least one of a camera, a millimeter-wave radar, an infrared sensor, a communication device, a raindrop sensor, and a temperature and humidity sensor. In this embodiment, the information acquisition device 22 is not limited to these, and may be any device that can be mounted on a window glass for a vehicle.

In this embodiment, the holes 18a and 18b are formed in the plurality of regions 10a and 10b, respectively, and by aligning, for example, a lens of a camera, a transmission/reception unit of a millimeter wave radar, a light reception unit of an infrared sensor, and the like with the positions of the holes 18a and 18b, the information outside the vehicle can be appropriately acquired. Further, in this embodiment, a hole separate from the holes 18a and 18b for the information acquisition device 22 may be formed in one of the plurality of regions 10a and 10b, and a mirror base for a rearview mirror may be directly attached to the window glass for a vehicle through the hole. In addition, the plurality of regions may include a region where the information acquisition device 22 cannot be attached.

As described above, the number of information acquisition devices attached to a window glass for a vehicle has increased in recent years due to the enhancement of the functions of the driver assistance system. As the number of information acquisition devices attached to a window glass for a vehicle increases, the area of the bracket used to attach the information acquisition device also increases.

The window glass for a vehicle has a curved shape. On the other hand, since the surface of the bracket to be bonded to the window glass for a vehicle is not curved but is substantially flat, when the area of the bracket increases, the restoring force (the force that tries to return to its original shape) acting on the bracket increases because the bracket is pasted to follow the curved surface of the window glass for a vehicle.

Specifically, since a window glass 121 for a vehicle has a curved shape as shown in the upper drawing of FIG. 3, when a bracket 101 whose surface to be bonded to the window glass for a vehicle is substantially flat is pasted to follow the curved surface of the window glass 121 for a vehicle, the restoring force that tries to return to its original shape (the force acting on the positive side of the z-axis direction) acts on the bracket 101 as shown in the lower drawing of FIG. 3. The magnitude of this restoring force increases as the area of the bracket 101 increases. As described above, when the restoring force acting on the bracket 101 increases, there is a problem after the bracket 101 is pasted to the window glass 121 for a vehicle that the bracket 101 may come off, the position of the fixing member for attaching the information acquisition device may be shifted, and a fitting failure may occur.

Figure 4:
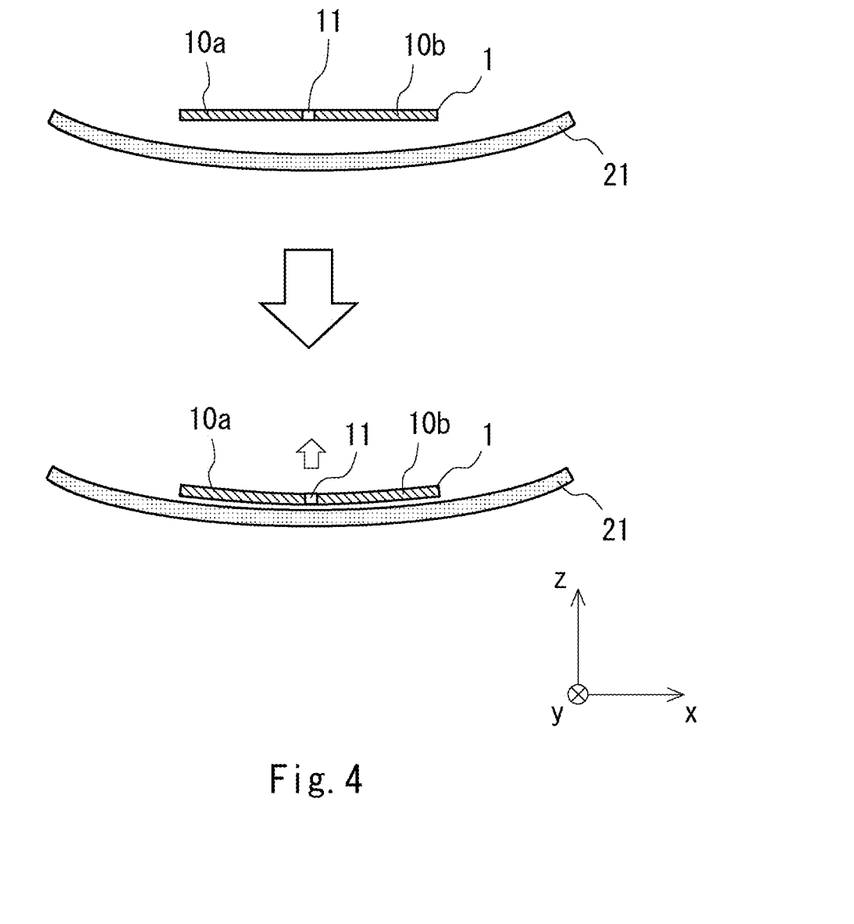
FIG. 4 is a cross-sectional view for explaining a state in which the bracket according to the embodiment is pasted to a window glass for a vehicle.

On the other hand, in this embodiment, as shown in the upper drawing of FIG. 4, the coupling region 11 is provided between the plurality of regions 10a and 10b of the bracket 1. The coupling region 11 has a mesh-like structure, and each of the plurality of regions 10a and 10b is flexibly coupled. Therefore, when the bracket 1 is pasted to the window glass 21 for a vehicle having a curved shape, as shown in the lower drawing of FIG. 4, each of the regions 10a and 10b can be made to follow the curvature of the surface of the window glass 21 for a vehicle. Therefore, the restoring force acting on the bracket 1 when the bracket 1 is pasted to the window glass 21 for a vehicle can be reduced. With this configuration, it is possible to help prevent, after the bracket 1 is pasted to the window glass 21 for a vehicle, the bracket 1 from coming off, the position of the fixing member for attaching the information acquisition device from being shifted, and the occurrence of a fitting failure. Accordingly, it is possible to provide a bracket and an information acquisition module for appropriately attaching the information acquisition device to the window glass for a vehicle.

In this embodiment, the plurality of regions 10a and 10b may be arranged in such a way that they are aligned in the left-right direction (x-axis direction) of the window glass 21 for a vehicle. In this case, when the bracket 1 is pasted to the window glass 21 for a vehicle having a curved shape, the coupling region 11 couples the plurality of regions 10a and 10b in such a way that they follow the curvature of the surface of the window glass for a vehicle in the left-right direction.

Figure 10:
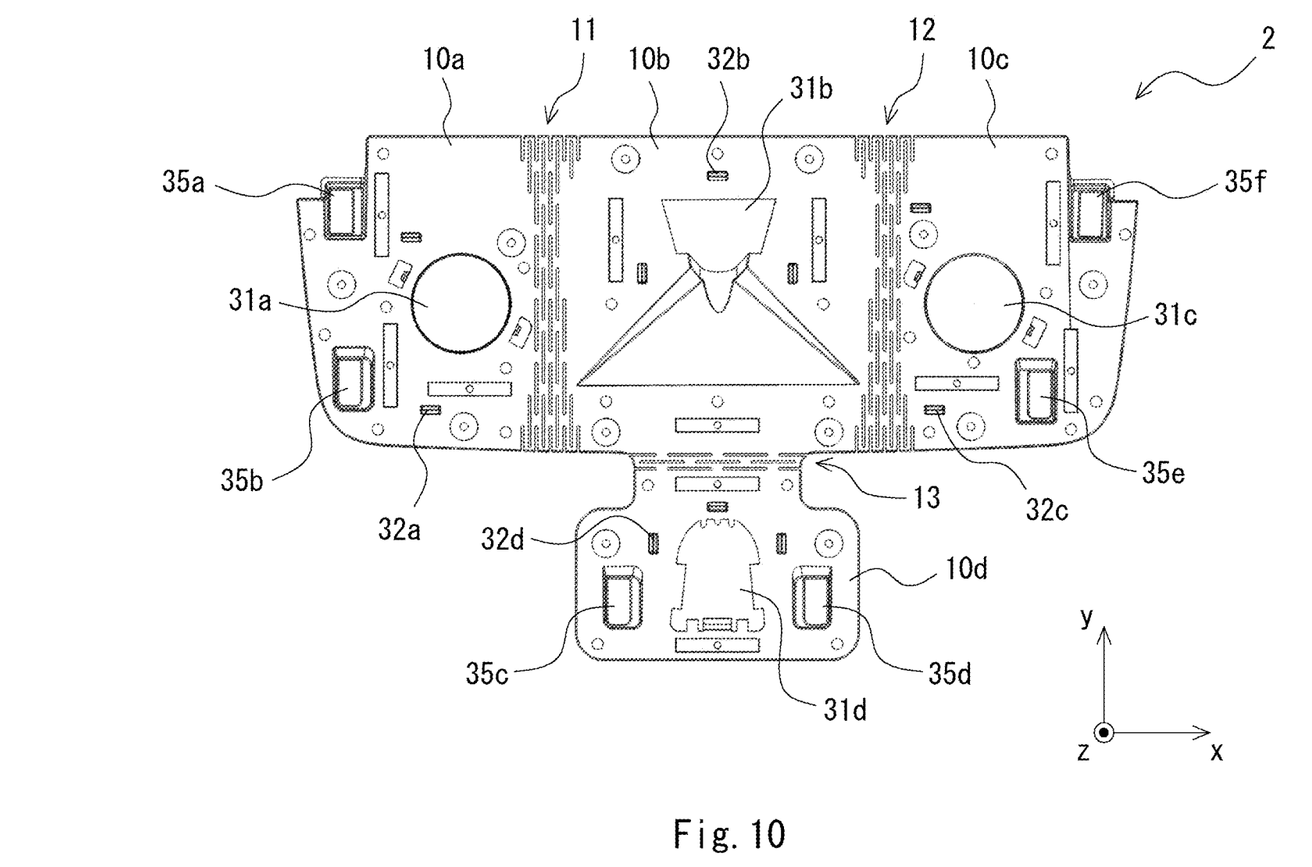
FIG. 10 is a plan view for explaining a specific configuration example of the bracket according to the embodiment.

In this embodiment, the plurality of regions may be arranged in such a way that they are aligned in the up-down direction (y-axis direction) of the window glass 21 for a vehicle (see regions 10b and 10d of FIG. 10). In this case, when the bracket is pasted to the window glass 21 for a vehicle having a curved shape, the coupling region couples the plurality of regions in such a way that they follow the curvature of the surface of the window glass 21 for a vehicle in the up-down direction.

For example, the radius of the curvature of the window glass 21 for a vehicle in the left-right direction (x-axis direction) is 2500 mm to 11000 mm, and the radius of the curvature in the up-down direction (y-axis direction) is 2000 mm to 7000 mm. That is, the window glass 21 for a vehicle has a double-curved shape that is curved in the left-right direction (x-axis direction) and the up-down direction (y-axis direction). The radius of the curvature in the left-right direction (x-axis direction) and the radius of the curvature in the up-down direction (y-axis direction) may be the same or different. The bracket 1 according to this embodiment can be suitably used for a window glass for a vehicle having such a radius of curvature. For example, the length of one region of the bracket 1 in the left-right direction (x-axis direction) is preferably 80 mm to 100 mm, and the length thereof in the up-down direction (y-axis direction) is preferably 60 mm to 80 mm.

In the configuration shown in FIG. 1, the coupling region 11 extends in the y-axis direction. Alternatively, in this embodiment, the coupling region 11 may be extended obliquely with respect to the y-axis direction.

In this embodiment, the plurality of regions 10a and 10b may be arranged in an oblique direction (direction oblique to the x and y axes). In this case, the direction in which the coupling region 11 extend may also be the oblique direction (direction oblique to the x and y axes).

In this embodiment, the number of the plurality of regions and the number of the coupling regions may be any. For example, in this embodiment, the number of the plurality of regions may be determined in accordance with the number of the information acquisition devices 22 attached to the bracket 1.

Figure 5:
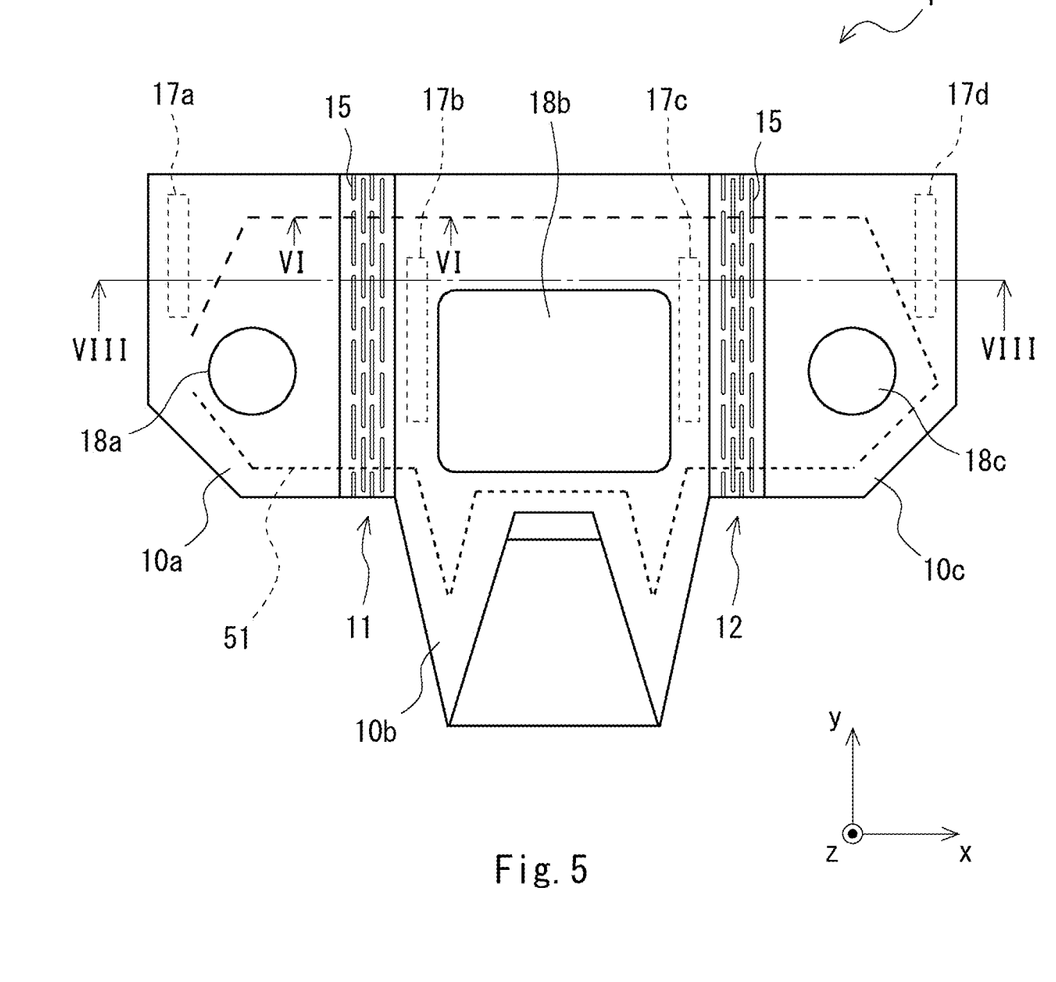
FIG. 5 is a plan view for explaining a case in which the bracket according to the embodiment is pasted to a window glass for a vehicle.
Figure 6:
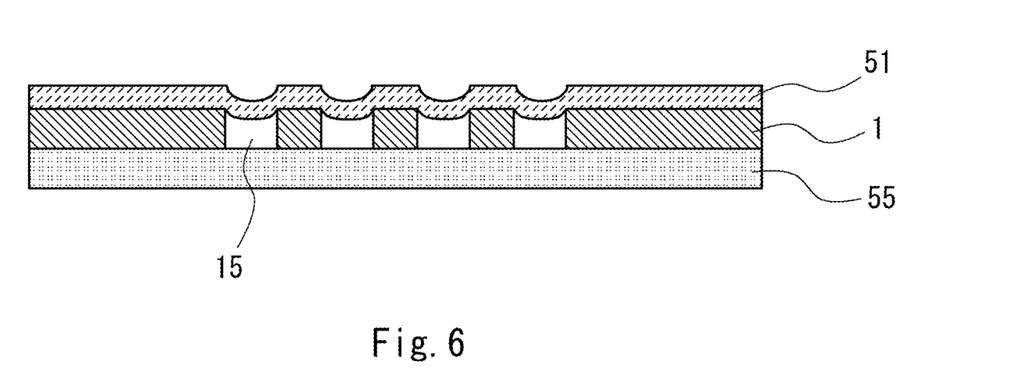
FIG. 6 is a cross-sectional view taken along the line VI-VI of FIG. 5.
Figure 7:
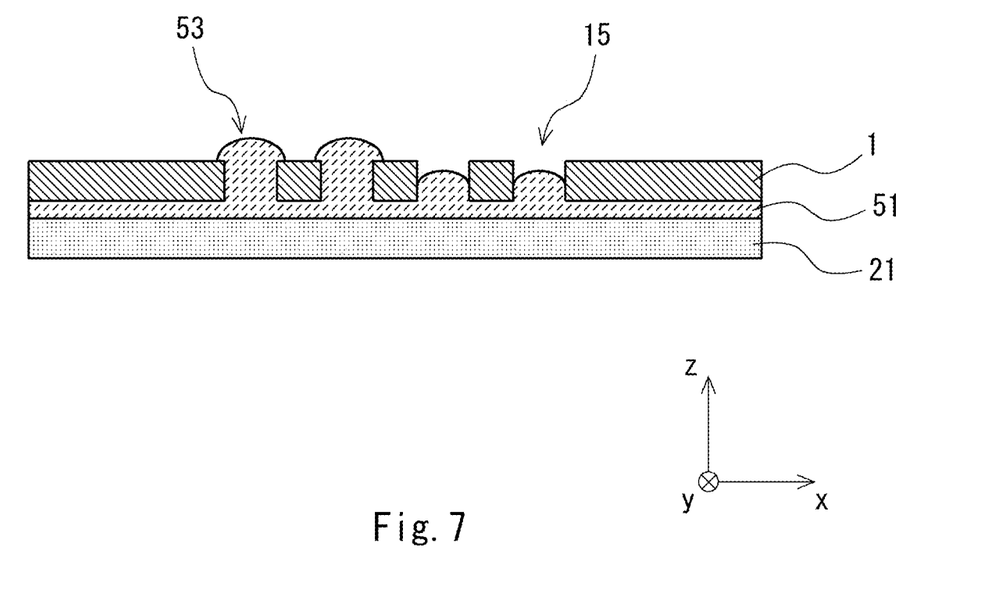
FIG. 7 is a cross-sectional view for explaining the state in which the bracket is pasted to the window glass for a vehicle.
Figure 8:
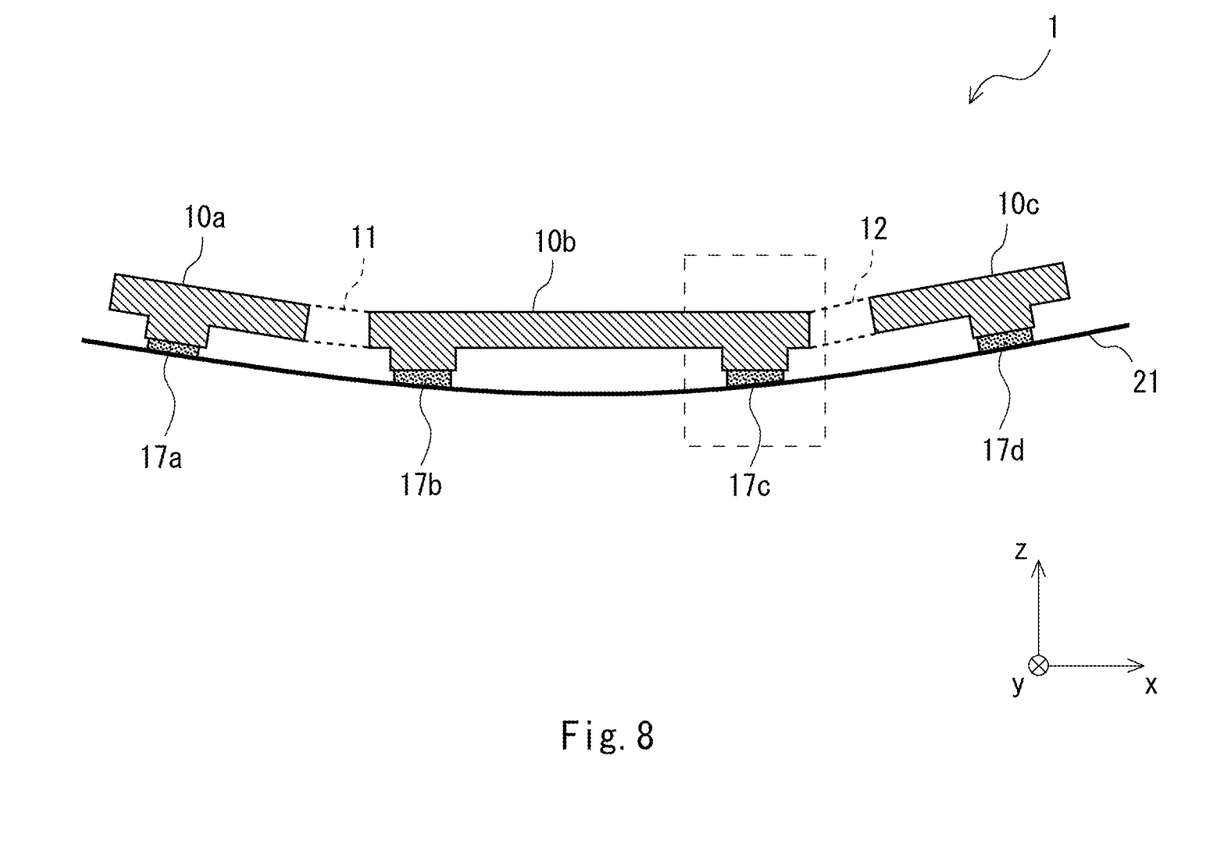
FIG. 8 is a cross-sectional view taken along the line VIII-VIII of FIG. 5.
Figure 9:
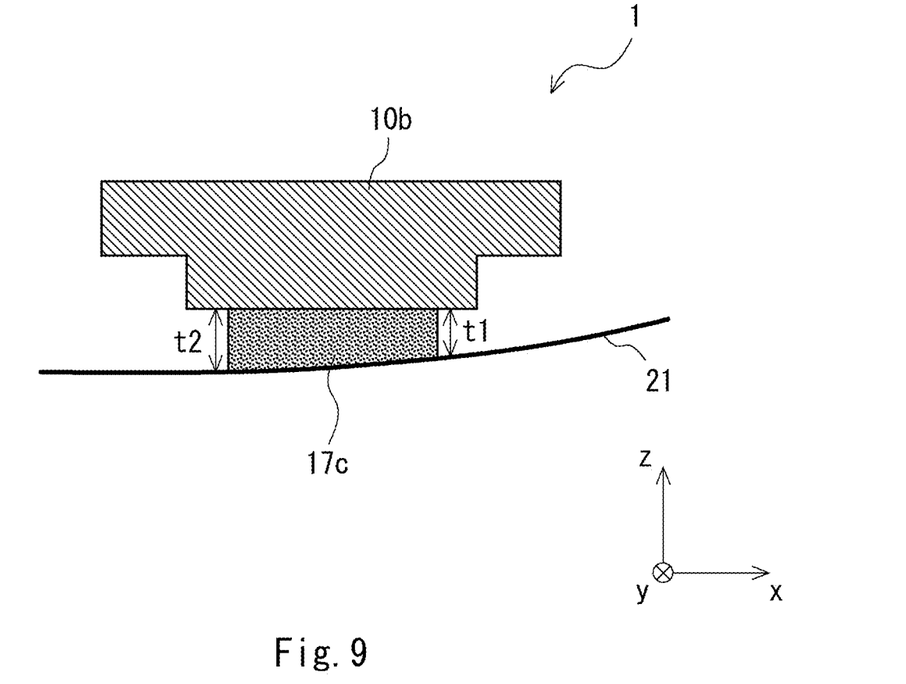
FIG. 9 is an enlarged cross-sectional view for explaining the case where the bracket according to the embodiment is pasted to the window glass for a vehicle.

Next, the case where the bracket according to this embodiment is pasted to the window glass for a vehicle will be described. FIG. 5 is a plan view for explaining the case where the bracket according to this embodiment is pasted to the window glass for a vehicle. FIG. 6 is a cross-sectional view taken along the line VI-VI of FIG. 5, and a cross-sectional view showing a state in which an adhesive is applied to the bracket. FIG. 7 is a cross-sectional view for explaining a state in which the bracket is pasted to the window glass for a vehicle. FIG. 8 is a cross-sectional view taken along the line VIII-VIII of FIG. 5. FIG. 9 is an enlarged cross-sectional view showing a part surrounded by the dashed line of FIG. 8. FIGS. 5 to 9 show a configuration in which the bracket 1 includes three regions 10a to 10c and two coupling regions 11 and 12. Specifically, the coupling region 11 flexibly couples the region 10a to the region 10b, and the coupling region 12 flexibly couples the region 10b to the region 10c. As shown in FIG. 5, the regions 10a to 10c are provided with holes 18a to 18c, respectively.

The window glass 21 for a vehicle may be a single pane of glass or laminated glass. When the window glass for a vehicle is a windshield, the window glass for a vehicle is preferably laminated glass. When the window glass for a vehicle is laminated glass, the window glass for a vehicle is formed by bonding an inner glass plate located on the inside of the vehicle when the window glass for a vehicle is attached to a vehicle and an outer glass plate located on the outside of the vehicle when the window glass for a vehicle is attached to a vehicle with an intermediate film interposed therebetween.

The window glass for a vehicle may be inorganic glass or organic glass. As the inorganic glass, for example, soda lime glass, aluminosilicate glass, borosilicate glass, alkali-free glass, quartz glass or the like may be used without particular restriction. Among these, soda lime glass is particularly preferable in terms of manufacturing cost and formability. The method of forming the window glass for a vehicle is not particularly limited. For example, in the case of inorganic glass, a glass plate formed by the float method or the like is preferable.

When the window glass for a vehicle is inorganic glass, the window glass for a vehicle may be either untempered glass or tempered glass. The untempered glass is formed by forming molten glass into a plate shape and cooling it slowly. The tempered glass is formed by forming a compressive stress layer on the surface of the untempered glass, and may be either air-cooled tempered glass or chemically tempered glass. When the window glass for a vehicle is laminated glass, the inner glass plate and the outer glass plate may be untempered glass. If the window glass for a vehicle is a single pane of glass, it may be tempered.

If the tempered glass is a physically tempered glass (e.g., wind-cooled tempered glass), the glass surface may be tempered by an operation other than slow cooling, such as quenching a glass plate uniformly heated in a bending process from a temperature near the softening point. This creates a compressive stress layer on the glass surface due to the temperature difference between the glass surface and the inside of the glass. If the tempered glass is chemically tempered glass, the glass surface may be tempered by causing compressive stress to be exerted on the glass surface by the ion exchange method or the like after a bending process. In addition, a glass which absorbs ultraviolet rays or infrared rays may be used as the window glass for a vehicle. While it is preferable for the window glass for a vehicle to be transparent, it may also be a tinted glass that does not significantly impair transparency.

The window glass for a vehicle may be curved so that the outer side of the window glass is convex when attached to the vehicle. When the window glass for a vehicle is laminated glass, both the inner glass plate and the outer glass plate may be curved so that the outer side of the vehicle is convex. As described above, the radius of the curvature of the window glass for a vehicle in the left-right direction (x-axis direction) is 2500 mm to 11000 mm, and the radius of the curvature in the up-down direction (y-axis direction) is 2000 mm to 7000 mm. Gravity molding, press molding, roller molding, or the like is used for bending the window glass for a vehicle.

When the window glass for a vehicle is laminated glass, the thickness of the inner glass plate and the thickness of the outer glass plate may be the same or different. The thickness of the inner glass plate is preferably 0.3 mm to 2.3 mm. A thickness of 0.3 mm or more for the inner glass plate provides good handling, and a thickness of 2.3 mm or less for the inner glass plate prevents excessive mass. The thickness of the outer glass plate is preferably 1.0 mm or more and 3.0 mm or less. A thickness of 1.0 mm or more for the outer glass plate provides sufficient strength, such as resistance to stone chips, and a thickness of 3.0 mm or less for the outer glass plate prevents the mass of the laminated glass from becoming too large, which is preferable in terms of fuel efficiency of the vehicle. When the thickness of the outer glass plate and the thickness of the inner glass plate are 1.8 mm or less, it is possible to achieve a balance between weight reduction and sound insulation of the laminated glass, which is preferable. When the thickness of the inner glass plate is 1.0 mm or less, the inner glass plate may be chemically tempered glass. When the inner glass plate is chemically tempered glass, the compressive stress value on the glass surface is preferably 300 MPa or more, and the depth of the compressive stress layer is preferably 2 μm or more.

When the window glass for a vehicle is laminated glass, for example, a known thermoplastic resin film such as polyvinyl butyral (PVB) or ethylene-vinyl acetate copolymer resin (EVA) is used as the intermediate film. The intermediate film may be transparent or colored. The intermediate film may be composed of two or more layers.

When the window glass for a vehicle is made of organic glass, the material of the organic glass may be a transparent resin such as polycarbonate or acrylic resin (e.g., polymethylmethacrylate).

The window glass for a vehicle is provided with a shielding layer at the periphery. When the window glass for a vehicle is laminated glass, the shielding layer may be provided at least one of at the periphery of the inner surface of the inner glass plate and at the periphery of the inner surface of the outer glass plate. The shielding layer may be formed, for example, by applying and firing a ceramic color paste containing a molten glass frit with black pigment. Since the shielding layer can prevent deterioration of an adhesive or the like applied to the window glass for a vehicle by ultraviolet rays, the bracket 1 according to this embodiment is pasted on the shielding layer. Various suitable films may be formed on the main surface of the window glass for a vehicle for the purpose of enhancing weather resistance and enhancing functionality such as hydrophilicity and water repellency.

As shown in FIGS. 5 and 7, when the bracket 1 according to this embodiment is pasted to the window glass 21 for a vehicle, an adhesive 51 is applied to the bracket 1 and then the bracket 1 is pasted to the window glass 21 for a vehicle. At this time, as shown in FIGS. 5 and 8, by temporarily fixing the bracket 1 to the window glass 21 for a vehicle using double-sided tapes 17a to 17d, it is possible to help prevent the bracket 1 from coming off or being shifted from the window glass 21 for a vehicle while the adhesive 51 dries.

As shown in FIG. 5, the plurality of regions 10a to 10c coupled by the coupling regions 11 and 12 are preferably fixed to the window glass 21 for a vehicle by the adhesive 51. When the plurality of regions 10a to 10c are fixed to the window glass 21 for a vehicle by the adhesive 51, the plurality of regions 10a to 10c do not change relative to each other. That is, after the bracket 1 is pasted to the window glass 21 for a vehicle and the adhesive 51 is dried, the positions of the regions 10a to 10c do not change either in the in-plane direction of the window glass 21 for a vehicle or in the direction away from the surface of the window glass 21 for a vehicle. In this embodiment, since the coupling region 11 flexibly bends or expands and contracts, when the bracket 1 is pasted to the window glass 21 for a vehicle, the bracket 1 can follow the curved surface of the window glass 21 for a vehicle and the positions of the regions 10a to 10c can be finely adjusted even if the relative positions of the regions 10a to 10c are shifted. However, after the adhesive 51 applied to the regions 10a to 10c is dried and the bracket 1 is fixed to the window glass 21 for a vehicle, the regions 10a to 10c do not change from the pasted positions. In addition, even if adhesive strength of the adhesive 51 applied to any of the regions 10a to 10c deteriorates due to reasons such as aging, since the regions 10a to 10c are coupled by the coupling regions 11 and 12, it is possible to help prevent the change of the region with reduced adhesive strength in either the in-plane direction of the window glass 21 for a vehicle or the direction away from the surface of the window glass 21 for a vehicle.

Further, as shown in FIG. 5, when the adhesive 51 (indicated by the dashed line in FIG. 5) is applied to the bracket 1 and pasted to the window glass 21 for a vehicle, the adhesive may be applied not only to the regions 10a to 10c of the bracket 1 but also to at least a part of the coupling regions 11 and 12. That is, an adhesive layer may be formed not only on the regions 10a to 10c of the bracket 1 but also on at least a part of the coupling regions 11 and 12. Further, at least a part of the adhesive layers of the regions 10a to 10c of the bracket 1 and the adhesive layer of the coupling regions 11 and 12 may be continuously formed. When the adhesive 51 is applied to the bracket 1 and then the bracket 1 is pasted to the window glass 21 for a vehicle, if the adhesive layer is formed in at least a part of the coupling regions 11 and 12, the adhesive area between the bracket 1 and the window glass 21 for a vehicle becomes larger, and therefore the adhesive strength of the bracket 1 is improved, which is preferable.

As shown in FIG. 6, when the adhesive 51 is applied to the bracket 1, the adhesive 51 is applied to the bracket 1 arranged on an adhesive application jig 55. At this time, the adhesive 51 applied on the elongated holes 15 of the coupling region 11 can be prevented from falling below the elongated holes 15 due to the viscosity of the adhesive 51. Therefore, the adhesive 51 can also be applied to the coupling region 11 where the elongated holes 15 are formed.

Further, as shown in FIG. 7, when the bracket 1 is pasted to the window glass 21 for a vehicle, since the adhesive 51 also enters the elongated holes 15 of the coupling regions 11 and 12 (the adhesive entered the elongated holes 15 is denoted by the reference number 53), it is visible that the adhesive is surely applied. In the step of applying the adhesive 51 to the bracket 1, the adhesive 51 can be applied continuously to the regions 10a to 10c and the coupling regions 11 and 12 (see FIG. 5), which is preferable. When the adhesive layer is also formed in the coupling regions 11 and 12 of the bracket 1, the adhesive may enter halfway through the elongated holes 15 of the coupling regions 11 and 12, or the elongated holes 15 may be completely filled with the adhesive (see FIG. 7). In addition, the adhesive layer may be formed by applying the adhesive 51 to all of the elongated holes 15 of the coupling regions 11 and 12, or the adhesive layer may be formed on only some of the elongated holes.

In this embodiment, as shown in FIG. 8, by temporarily fixing the bracket 1 to the window glass 21 for a vehicle using the double-sided tapes 17a to 17d, the bottom surface of the bracket 1 (region 10b) can be appropriately fixed to the surface of the window glass 21 for a vehicle having a curved shape. In other words, as shown in FIG. 9, when the thickness of the double-sided tape 17c on the positive side in the x-axis direction is t1 and the thickness thereof on the negative side in the x-axis direction is t2, the difference between the distance between the surface of the window glass 21 for a vehicle and the bottom surface of the region 10b on the positive side in the x-axis direction and the distance between the surface of the window glass 21 for a vehicle and the bottom surface of the region 10b on the negative side in the x-axis direction can be eliminated with the double-sided tape 17c.

In the above description, an example in which the bracket 1 is temporarily fixed using the double-sided tapes 17a to 17d when the bracket 1 is pasted to the window glass 21 for a vehicle using the adhesive 51 has been described. However, in this embodiment, it is not necessary to temporarily fix the bracket 1 using the double-sided tapes 17a to 17d, and instead the bracket 1 may be directly pasted to the window glass 21 for a vehicle using the adhesive 51 without using the double-sided tapes 17a to 17d.

Next, a specific configuration example of the bracket according to this embodiment will be described with reference to the plan view shown in FIG. 10. A bracket 2 shown in FIG. 10 includes regions 10a to 10d. The regions 10a to 10c are aligned in the x-axis direction. This direction corresponds to the left-right direction of the window glass for a vehicle. The regions 10b and 10d are aligned in the y-axis direction. This direction corresponds to the up-down direction of the window glass for a vehicle.

A coupling region 11 is provided between the regions 10a and 10b. The coupling region 11 flexibly couples the region 10a to the region 10b. A coupling region 12 is provided between the region 10b and the region 10c. The coupling region 12 flexibly couples the region 10b to the region 10c. A coupling region 13 is provided between the region 10b and the region 10d. The coupling region 13 flexibly couples the region 10b to the region 10d.

The regions 10a to 10d are provided with holes 31a to 31d, respectively. Each of the holes 31a to 31d are parts from which a resin material constituting the bracket 2 has been removed, and by aligning, for example, a lens position of a camera, a transmission/reception unit of a millimeter wave radar, a light reception unit of the infrared sensor, and the like with the positions of the holes 31a to 31d, information about the outside of the vehicle can be appropriately acquired.

The regions 10a to 10d are provided with fixing members 32a to 32d, respectively. When the information acquisition devices are attached to the respective regions 10a to 10d, the information acquisition devices are fixed using the respective fixing members 32a to 32d. FIG. 10 shows an example in which the fixing members 32a to 32d have protruded shapes, but the shapes of the fixing members 32a to 32d are not limited to this.

The bracket 2 is provided with fixing members 35a to 35f. For example, the six fixing members 35a to 35f are formed on the bracket 2, and a cover covering the entire bracket 2 can be fixed using the fixing members 35a to 35f. In other words, by using the fixing members 35a to 35f, a cover covering the information acquisition devices provided in the respective regions 10a to 10d can be fixed. A cover covering each information acquisition device may be provided in each of the regions 10a to 10d.

Figure 11:
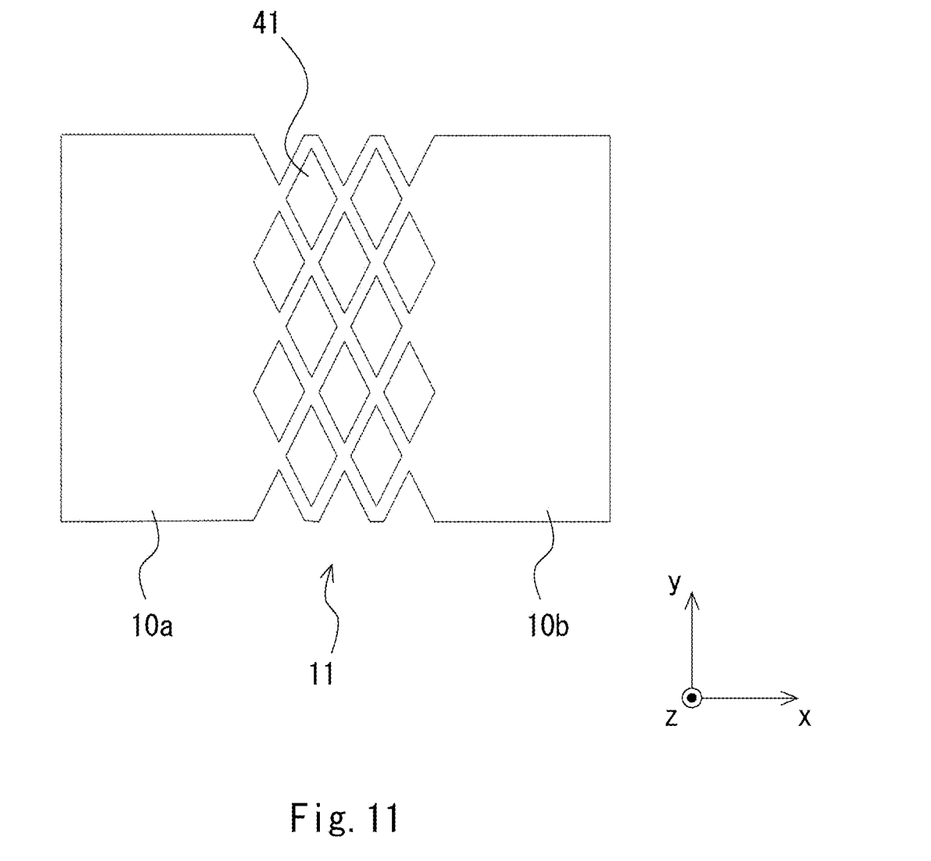
FIG. 11 is a plan view for explaining another configuration example of a coupling region.
Figure 12:
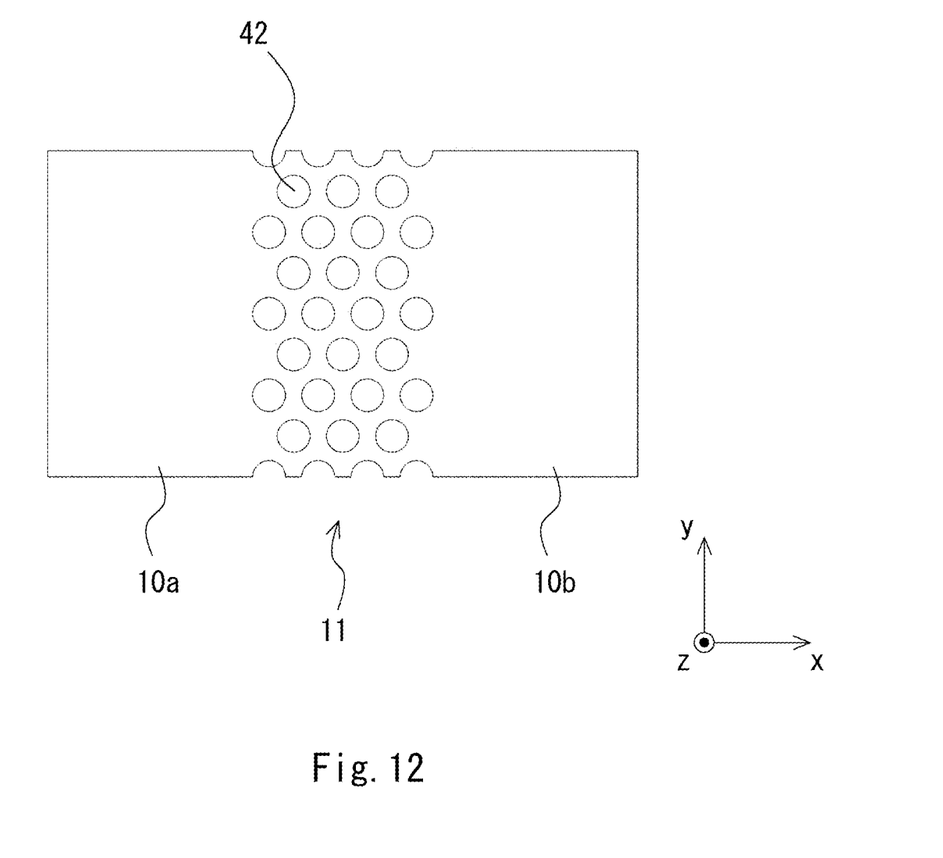
FIG. 12 is a plan view for explaining another configuration example of the coupling region.

Note that the present disclosure is not limited to the above embodiments, and may be suitably modified to the extent that it does not deviate from the scope thereof. For example, in the configuration example shown in FIG. 1 and so on, the plurality of elongated holes 15 are formed in the coupling region 11, and the coupling region 11 is meshed. However, in this embodiment, for example, as shown in FIG. 11, the coupling region 11 may be meshed by forming a plurality of polygonal holes 41 in the coupling region 11. In FIG. 11, the shape of the holes 41 is rhombic, and instead the shape of the holes may be hexagonal or octagonal. For example, as shown in FIG. 12, the coupling region 11 may be meshed by forming a plurality of circular holes 42 in the coupling region 11. The shape of the holes 42 may be oval. In this embodiment, if the coupling region can be meshed, the shape of the holes provided in the coupling region may be any shape other than those described above.

In the bracket 1, the elongated holes 15 in the coupling region 11 are preferably through-holes. Also, the thickness of the part of the coupling region 11 that is not the elongated holes 15, i.e., the part of the resin material, is preferably the same as the thickness of at least one of the regions adjacent to the coupling region 11 of the plurality of regions 10a and 10b. Preferably, the thickness of the part of the coupling region 11 that is not the elongated holes 15, i.e., the part of the resin material, is the same as the thickness of at least one of the regions adjacent to the coupling region 11 of the plurality of regions 10a and 10b. This improves the strength of the bracket 1 in the coupling region 11, which is preferable.

As shown in FIG. 1 and so on, the coupling region 11 preferably has a plurality of rows of elongated holes 15. When the elongated holes 15 are formed in a plurality of rows, the strength of the bracket 1 in the coupling region 11 is improved, and at the same time, the flexibility and expandability of the coupling region 11 are improved, which is preferable. Similarly, as shown in FIGS. 11 and 12, it is preferable that the holes 41 and 42 are formed in a plurality of rows. As shown in FIG. 10, the number of elongated holes in the coupling regions 11 and 12 may vary from row to row. As shown in FIG. 10, in the coupling regions 11 and 12, the number of elongated holes on the outer peripheral edge side of the bracket 2 may be large, and the number of elongated holes may gradually decrease toward the center of the coupling regions 11 and 12.

In addition, in the coupling regions 11, 12, and 13 shown in FIG. 10, the coupling regions are preferably formed continuously from the upper side to the lower side and/or from the right side to the left side of the bracket 2, as shown in FIG. 1 and so on. When the coupling regions are formed continuously from the upper side to the lower side and/or from the right side to the left side of the bracket 2, the flexibility and expandability of the coupling regions 11, 12, and 13 are improved, which is preferable.

In the coupling regions 11, 12, and 13 shown in FIG. 10, the ratio of the total area of the elongated holes 15 to the area of each coupling region is preferably 20% to 50%. If the ratio of the total area of the elongated hole 15 to the area of the coupling region is 20% or more, the coupling region can flexibly bend or expand and contract, which is preferable. If the ratio of the total area of the elongated hole 15 to the area of the coupling region is 50% or less, it is preferable because the strength of the bracket 1 in the coupling regions 11, 12, and 13 is improved.

Furthermore, the bracket according to this embodiment can fix components other than the information acquisition device to the window glass for a vehicle. For example, the bracket according to this embodiment may be used to fix a resin component (such as a clip) to the window glass for a vehicle. That is, the bracket according to this embodiment may be used for a seat surface of a resin component (such as a clip). By using the bracket according to this embodiment for a seat surface of a resin component, it is possible to improve the adhesiveness when the resin component is fixed to the window glass for a vehicle.

Although the present disclosure has been described in accordance with the above embodiments, the present disclosure is not limited only to the configuration of the above embodiments, but of course includes various variations, modifications, and combinations that a person skilled in the art can make within the scope of the claimed disclosure.

What is claimed is:

1. A bracket made of resin for fixing an information acquisition device to a window glass for a vehicle having a curved shape, the bracket comprising:
    a plurality of regions; and
    a coupling region provided between the plurality of regions, wherein
    the coupling region has a mesh-like structure and flexibly couples each of the plurality of regions,
    wherein the plurality of regions are arranged in such a way that they align in a left-right direction of the window glass for a vehicle, and
    wherein the coupling region couples the plurality of regions in such a way that, when the bracket is pasted to the window glass for a vehicle, the plurality of regions follow a curved surface of the window glass for a vehicle in the left-right direction.

2. The bracket according to claim 1, wherein
    the plurality of regions are arranged in such a way that they align in an up-down direction of the window glass for a vehicle, and
    the coupling region couples the plurality of regions in such a way that, when the bracket is pasted to the window glass for a vehicle, the plurality of regions follow a curved surface of the window glass for a vehicle in the up-down direction.

3. The bracket according to claim 1, wherein
    each of the plurality of regions is configured in such a way that a different information acquisition device can be attached thereto, and
    each of the plurality of regions is provided with a fixing member for fixing each of the information acquisition devices.

4. The bracket according to claim 1, wherein the coupling region comprises a shape in which a plurality of elongated holes extend in a direction perpendicular to a direction in which the plurality of regions are arranged.

5. The bracket according to claim 1, wherein the coupling region comprises a shape in which a plurality of circular holes are formed.

6. The bracket according to claim 1, wherein the coupling region comprises a shape in which a plurality of polygonal holes are formed.

7. An information acquisition module comprising:
    the bracket according to claim 1 pasted to the window glass for a vehicle;
    a plurality of information acquisition devices attached to the plurality of regions of the bracket, respectively; and
    a cover for covering the plurality of information acquisition devices.

8. The information acquisition module according to claim 7, wherein the information acquisition device is at least one of a camera, a millimeter wave radar, an infrared sensor, a communication device, a raindrop sensor, and a temperature and humidity sensor.

* * * * *